(12) United States Patent
Tomes

(10) Patent No.: US 12,480,426 B2
(45) Date of Patent: Nov. 25, 2025

(54) CONTAINMENT RING FOR GAS TURBINE ENGINE

(71) Applicant: Pratt & Whitney Canada Corp., Longueuil (CA)

(72) Inventor: Nathan Tomes, Hamilton (CA)

(73) Assignee: PRATT & WHITNEY CANADA CORP., Québec (CA)

( * ) Notice: Subject to any disclaimer, the term of this patent is extended or adjusted under 35 U.S.C. 154(b) by 0 days.

(21) Appl. No.: 18/652,688

(22) Filed: May 1, 2024

(65) Prior Publication Data

US 2025/0341178 A1 Nov. 6, 2025

(51) Int. Cl.
F01D 25/24 (2006.01)

(52) U.S. Cl.
CPC ........ F01D 25/24 (2013.01); *F05D 2250/283* (2013.01); *F05D 2300/603* (2013.01)

(58) Field of Classification Search
CPC ...... F04D 29/526; F04D 29/52; F04D 29/023; F04D 29/40; F01D 21/045; F01D 25/24; F01D 11/12; F01D 11/22; F01D 11/125; F01D 11/127; F05D 2240/14
See application file for complete search history.

(56) References Cited

U.S. PATENT DOCUMENTS

| | | | |
|---|---|---|---|
| 4,534,698 A * | 8/1985 | Tomich | F01D 21/045 415/121.2 |
| 5,823,739 A | 10/1998 | Van Duyn | |
| 6,652,222 B1 * | 11/2003 | Wojtyczka | B32B 5/18 415/200 |
| 9,249,681 B2 | 2/2016 | Robertson, Jr. et al. | |
| 9,945,254 B2 | 4/2018 | Ivakitch et al. | |
| 2011/0286839 A1 * | 11/2011 | Wojtyczka | F01D 21/045 415/173.4 |

FOREIGN PATENT DOCUMENTS

| | | |
|---|---|---|
| EP | 1669550 A2 | 6/2006 |
| EP | 2290197 A2 | 3/2011 |
| EP | 2940251 A1 | 11/2015 |
| FR | 2875850 A1 | 3/2006 |

OTHER PUBLICATIONS

Extended European Search Report for EP Application No. 25173778.9; Issue date, Sep. 23, 2025, 9 pages.

* cited by examiner

*Primary Examiner* — Nathaniel E Wiehe
*Assistant Examiner* — Maxime M Adjagbe
(74) *Attorney, Agent, or Firm* — CANTOR COLBURN LLP

(57) ABSTRACT

A casing for a gas turbine engine, including: a plurality of layers of a structural material, wherein each layer of the plurality of layers of the structural material are separated from each other by at least one layer of an impact absorbing material, the at least one layer of impact absorbing material being different from the structural material and the impact absorbing material having a radial thickness that is greater than a radial thickness of the structural material, wherein the plurality of layers of the structural material comprises at least three layers.

17 Claims, 3 Drawing Sheets

CONTAINMENT RING FOR GAS TURBINE ENGINE

BACKGROUND

This disclosure relates to gas turbine engines, and more particularly to a containment ring for a gas turbine engine.

Gas turbine engines include rotating blades. In the event of a failure of any of the rotating blades it is desirable to contain the dislodged blade within the engine.

As such, it is desirable to provide an apparatus and method for blade containment in a gas turbine engine.

BRIEF DESCRIPTION

Disclosed is a casing for a gas turbine engine, including: a plurality of layers of a structural material, wherein each layer of the plurality of layers of the structural material are separated from each other by at least one layer of an impact absorbing material, the at least one layer of impact absorbing material being different from the structural material and the impact absorbing material having a radial thickness that is greater than a radial thickness of the structural material, wherein the plurality of layers of the structural material comprises at least three layers.

In addition to one or more of the features described above, or as an alternative to any of the foregoing embodiments, radially extending circumferential ribs are embedded into the at least one layer of an impact absorbing material, the radially extending circumferential ribs being configured to define an area of absorption in the at least one layer of an impact absorbing material.

In addition to one or more of the features described above, or as an alternative to any of the foregoing embodiments, the structural material is a reinforced composite material and/or sheet metal and the at least one impact absorbing layer is made of honeycomb and/or foam and/or corrugated metal.

In addition to one or more of the features described above, or as an alternative to any of the foregoing embodiments, the structural material is a sheet metal or a reinforced composite material and the impact absorbing material is a layer of foam.

In addition to one or more of the features described above, or as an alternative to any of the foregoing embodiments, the plurality of layers of the structural material comprise an inner most layer, at least one intermediate layer and an outer most layer, the inner most layer defining a portion of an interior surface of the casing and the outer most layer defining a portion of an exterior surface of the casing, the at least one intermediate layer being located between the inner most layer and the outer most layer.

In addition to one or more of the features described above, or as an alternative to any of the foregoing embodiments, radially extending circumferential ribs are embedded into the at least one layer of an impact absorbing material, the radially extending circumferential ribs being configured to define an area of absorption in the at least one layer of an impact absorbing material and wherein the radially extending circumferential ribs extend from the inner most layer towards the at least one intermediate layer and/or from the at least one intermediate layer towards the inner most layer.

In addition to one or more of the features described above, or as an alternative to any of the foregoing embodiments, the outer most layer includes at least one hairpin feature.

In addition to one or more of the features described above, or as an alternative to any of the foregoing embodiments, the at least one hairpin feature includes a first radially extending wall portion connected to a second radially extending wall portion.

In addition to one or more of the features described above, or as an alternative to any of the foregoing embodiments, the inner most layer and the intermediate layer are formed from a composite material, and the outer most layer is formed from metal and the at least one layer of impact absorbing material located between the inner most layer and the intermediate layer is a honeycomb material and the at least one layer of impact absorbing material located between the intermediate layer and the outer most layer is a honeycomb.

In addition to one or more of the features described above, or as an alternative to any of the foregoing embodiments, the at least one hairpin feature is a first hairpin feature and a second hairpin feature, the first hairpin feature having a first radially extending wall portion connected to a second radially extending wall portion and the second hairpin feature having a first radially extending wall portion connected to a second radially extending wall portion.

In addition to one or more of the features described above, or as an alternative to any of the foregoing embodiments, the first hairpin feature is forward of a direct impact zone defined by the outer most layer and the second hairpin feature is rearward of the direct impact zone defined by the outer most layer.

In addition to one or more of the features described above, or as an alternative to any of the foregoing embodiments, an end of the first radially extending wall portion is connected to an end of the second radially extending wall portion by an axially extending portion and an opposite end of the first radially extending wall portion is not connected to an opposite end of the second radially extending wall portion such that a cavity is defined by the first radially extending wall portion, the second radially extending wall portion and the axially extending portion.

In addition to one or more of the features described above, or as an alternative to any of the foregoing embodiments, a portion of the at least one layer of an impact absorbing material is located in the cavity.

In addition to one or more of the features described above, or as an alternative to any of the foregoing embodiments, the structural material is a sheet metal or a reinforced composite material and the impact absorbing material is layer of honeycomb material or foam.

In addition to one or more of the features described above, or as an alternative to any of the foregoing embodiments, the first radially extending wall portion has a longer axial length than the second radially extending wall portion such that an offset is provided between the first radially extending wall portion and the second radially extending wall portion.

In addition to one or more of the features described above, or as an alternative to any of the foregoing embodiments, the first radially extending wall portion has a longer axial length than the second radially extending wall portion such that an offset is provided between the first radially extending wall portion and the second radially extending wall portion.

Also disclosed is a gas turbine engine, including: a fan having a plurality of fan blades; a casing surrounding the plurality of fan blades, the casing including: a plurality of layers of a structural material, wherein each layer of the plurality of layers of the structural material are separated from each other by at least one layer of an impact absorbing material, the at least one layer of impact absorbing material being different from the structural material and the impact absorbing material having a radial thickness that is greater than a radial thickness of the structural material, wherein the plurality of layers of the structural material comprises at least three layers.

In addition to one or more of the features described above, or as an alternative to any of the foregoing embodiments, radially extending circumferential ribs are embedded into the at least one layer of an impact absorbing material, the radially extending circumferential ribs being configured to define an area of absorption in the at least one layer of an impact absorbing material.

In addition to one or more of the features described above, or as an alternative to any of the foregoing embodiments, the plurality of layers of the structural material include an inner most layer, at least one intermediate layer and an outer most layer, the inner most layer defining a portion of an interior surface of the casing and the outer most layer defining a portion of an exterior surface of the casing, the at least one intermediate layer being located between the inner most layer and the outer most layer.

In addition to one or more of the features described above, or as an alternative to any of the foregoing embodiments, the radially extending circumferential ribs extend from the inner most layer towards the at least one intermediate layer and/or from the at least one intermediate layer towards the inner most layer.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the FIGS.

Figure 1:
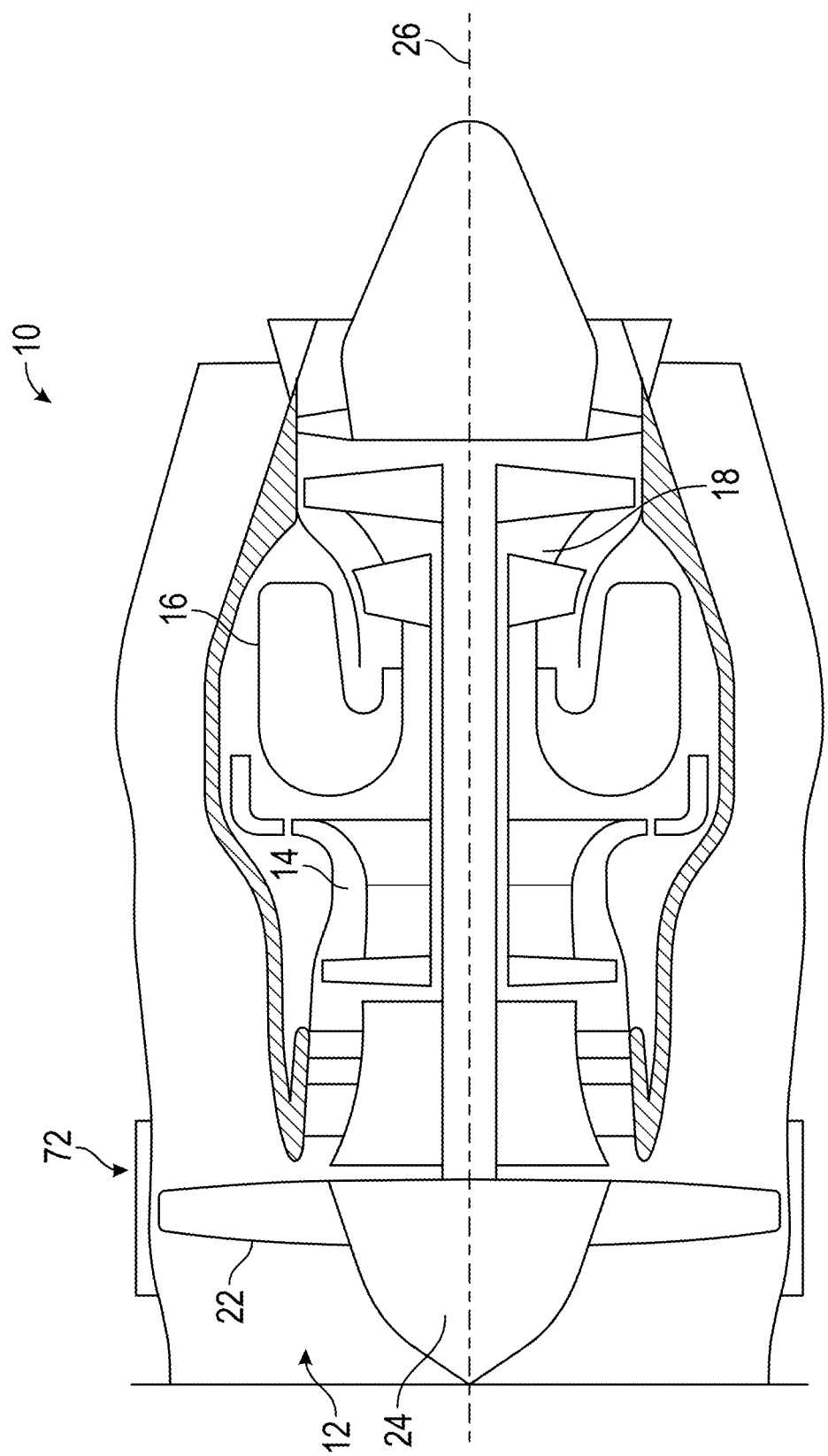
FIG. 1 is a schematic, partial cross-sectional view of a gas turbine engine in accordance with this disclosure.

FIG. 1 illustrates a turbofan gas turbine engine 10 of a type provided for use in subsonic flight, generally comprising in serial flow communication a fan 12 through which ambient air is propelled, a multi-stage compressor 14 for pressurizing the air, a combustor 16 in which the compressed air is mixed with fuel and ignited for generating an annular stream of hot combustion gases, and a turbine section 18 for extracting energy from the combustion gases. The fan 12 includes a fan case 72 surrounding a circumferential array of fan blades 22 extending radially outwardly from a rotor 24 mounted for rotation about a central axis 26 of the engine 10.

It should be noted that the terms "radial", "axial" and "circumferential" used throughout the description and the appended claims, are defined with respect to the central axis 26 of the engine 10. The terms "front", "forward" "afore", "aft" and after" used throughout the description and the appended claims are defined with respect to the flow direction of air being propelled through the engine.

In one non-limiting example, the fan 12 includes a plurality of fan blades 22. It is necessary to retain high energy debris resulting from a blade failure of any stage in the gas turbine engine 10 and this debris must be contained within the engine. In the case of a fan blade off, there are at least two dominant methods of achieving the containment of the fan blades 22. These may be referred to as hard wall and soft wall.

Hardwall containment relies upon a single ring of a strong material to contain the fan blade. This ring can be made of metal or composite, it may have ribs for stiffening specific areas, may have variable thickness or radius, and the fan case may include other layers (abradable and/or a blade tip blunting layer for example), but most of the energy is absorbed by the single containment ring. The advantage of hardwall containment is that it achieves containment reliably within a relatively small amount of space and with limited deflection, allowing the nacelle profile to be defined as tight as possible to the gas path to minimize powerplant drag. The disadvantages are that the forces generated in containment are very high, and are concentrated directly at the point of impact with limited redistribution around the ring, and the released blade remains in the gaspath, continuing to interact with the remaining blades, usually fracturing into multiple pieces, and travelling either upstream out the inlet or downstream out the exhaust and possibly interacting with structure along the way. The high, concentrated containment forces are transferred to the inlet, often driving heavier designs for inlet attachment flange and inlet structure. The blade remaining in the gaspath causes higher interaction forces with the following blade, sometimes driving increased blade weight to withstand these forces or in a few cases, causing multiple blades to release. The longer interaction also causes difficulties for trajectory predictions which are an important simulation validation point.

Soft wall containment relies on a multi-layered belt of dry Kevlar to contain the fan blade. The blade is allowed to pass through the structure of the fan cases (often a lightweight sandwich structure) and hit the Kevlar. The Kevlar belts slip and stretch significantly while absorbing the blade's kinetic energy, causing a large bulge. The longer distance across which the blade travels during containment means that the peak force on the fan case is lower compared to hardwall containment, and the belt effectively redistributes the containment force around the circumference of the case. These effects together usually allow the fan case and adjacent structure to be lighter compared to hardwall containment. In addition, because the released blade exits the gaspath entirely, it only briefly interacts with the remaining fan blades, allowing further weight reduction. While prediction of the released blade trajectory is not trivial in soft wall containment, it is less chaotic than hardwall systems because following containment the blade is trapped between the case structure and the Kevlar belt. The disadvantages of soft wall containment are that the Kevlar bulge is significant, driving the nacelle loft outward, increasing drag. The bulge also causes the need for a keep out zone all around the fan case through which no crucial or hazardous hardware may pass, further complicating the design.

Figure 2:
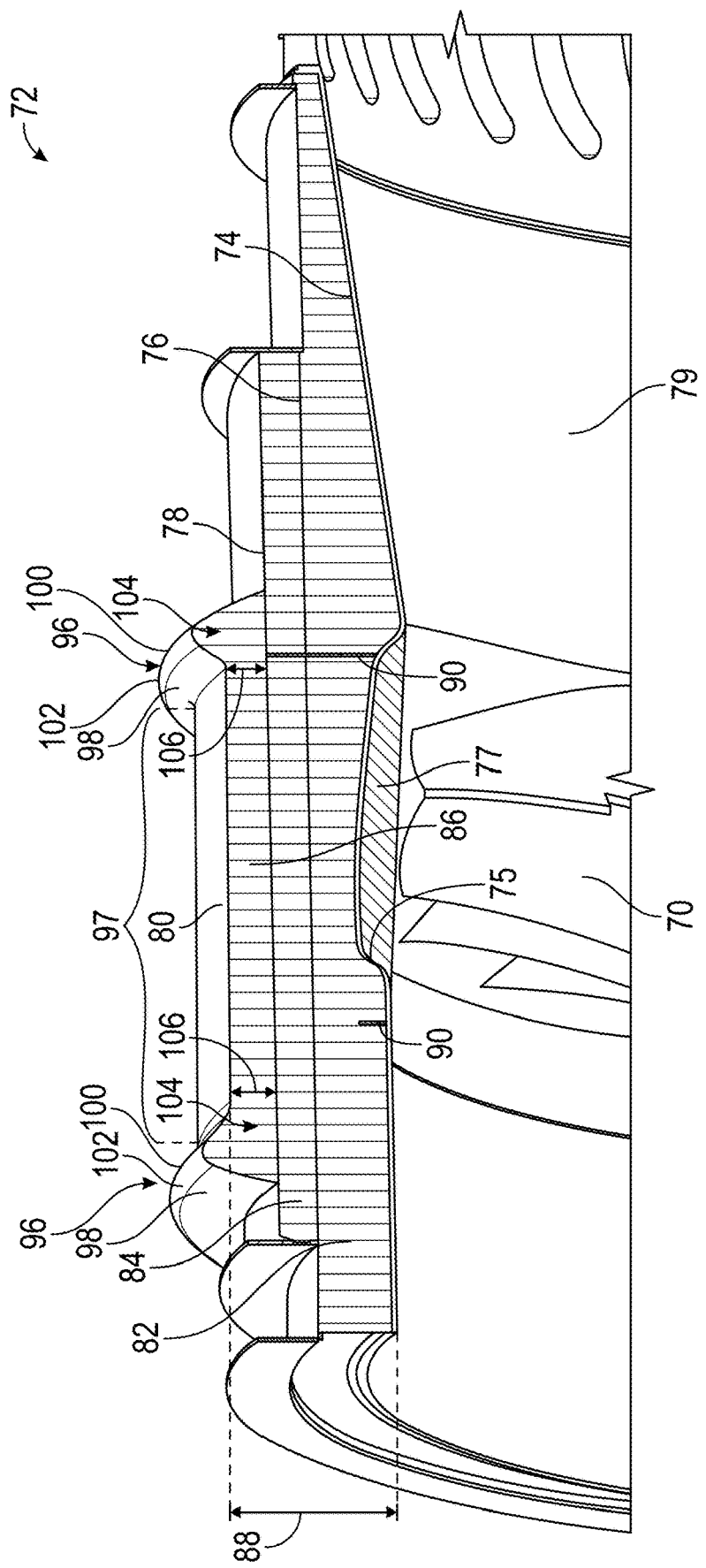
FIG. 2 is a partial perspective cross-sectional view fan case in accordance with the present disclosure.

FIG. 2 illustrates a portion of a case or casing 72 in accordance with the present disclosure. In one embodiment, the case or casing 72 is a fan case or casing 72 intended to retain fan blades 22 of the fan 12. It should be understood that while the case or casing 72 is illustrated as a fan case or casing the design of the case or casing 72 can be applied to other containment stages of the gas turbine engine (e.g., compressor section and turbine section).

As used herein forward or upstream and rearward or downstream refer are relative to the engine central longitudinal axis 26 and the direction gases flowing through the gas turbine engine 10. In addition, radially inward and radially outward also refer to the engine central longitudinal axis 26.

As used herein, "integral" or "integrally formed" is intended to cover a single unitary structure. In other words, the single unitary structure is not capable of being disassembled without cutting or destruction of the single unitary structure.

As illustrated in at least FIG. 2, the case or casing 72 includes multiple layers 74, 76, 78 and 80 of a thin layer of structural material such as a thin sheet metal, and multiple layers of an impact absorbing material 82, 84 and 86, built up to a significant thickness 88 as shown in FIG. 2. In one non-limiting embodiment the layers of the impact absorbing material 82, 84 and 86 are high strength honeycomb layers. In one non-limiting embodiment, the layer of honeycomb is NOMEX honeycomb or aluminum single or double flex honeycomb or corrugated aluminum. As used herein, NOMEX honeycomb refers to a honeycomb core formed from NOMEX paper sheets that are coated and bonded together with a phenolic resin. NOMEX paper may be defined as sheets formed from a synthetic aromatic polyamide polymer or a synthetic textile fiber or equivalents thereof. In one non-limiting embodiment, the high specific strength honeycomb layers 82, 84 and 86 are bounded on at least one side by one of the layers of structural material 74, 76, 78 and 80. The layers of structural material 74, 76, 78 and 80 may also be referred to as an inner most layer or radially inner most layer 74, an outer most layer or radially outer most layer 80 and intermediate layers 76 and 78 that are located between the inner most layer or radially inner most layer 74 and the outer most layer or radially outer most layer 80. Note: while two intermediate layers 76 and 78 are illustrated various embodiments of the present disclosure are intended to cover more than two intermediate layers 76 and 78 or only a single intermediate layer located between the inner most layer or radially inner most layer 74 and the outer most layer or radially outer most layer 80. As illustrated in at least FIG. 2, the high specific strength honeycomb layers 82, 84 and 86 are thicker or larger than the thin layers of structural material in a radial direction. In other words, the thickness of each honeycomb layer 82, 84 and 86 is much lager than the thickness of each layer of structural material 74, 76, 78 and 80.

In one non-limiting embodiment, one or more or all of the sheet metal layers 74, 76, 78 and 80 may be formed from a reinforced composite such as carbon, glass, or aramid fiber reinforced epoxy or equivalents thereof as opposed to sheet metal.

In one non-limiting embodiment the layers of a high specific strength honeycomb 82, 84 and 86 may be double flex by Hexcel that provides high crush strength to weight ratios or materials that crush at a constant axial stress over 22% or more of their thickness, reliably absorbing significant energy without generating enormous forces. To be effective, the faces of the honeycomb must be stabilized so that the cells don't distort from in plane stresses, this is done with the thin sheet metal face sheets 74, 76, 78 and 80. In an alternative embodiment, one or more of all of the high strength honeycomb layers 82, 84 and 86 may be replaced with high specific strength foams. In one non-limiting embodiment, the foam may be aluminum or polymer open or closed cell foam.

In addition, and as illustrated in FIG. 2, the multi-layer sandwich construction may have embedded circumferential ribs 90 that extend radially inward or outward depending on which layer (74, 76, 78 and 80) they extend from and the ribs are configured to define an area of absorption in at least one of the layers of impact absorbing material. For example, the ribs may extend radially outward from the inner most layer or sheet 74 and radially inward from the outer most layer or sheet 80 and the ribs 90 may extend radially inward and/or outward from anyone of the intermediate layers or sheets 76 and 78. The embedded circumferential ribs 90 act as stiff points as a blade 22 passes into the case or casing 72. The circumferential ribs 90 extend radially outward from an inner most sheet metal sheet 74 towards an outermost sheet 80 and through at least one the high strength honeycomb layers 82, 84 and 86. In one non-limiting embodiment, the circumferential ribs 90 are formed from sheet metal or a reinforced composite such as carbon glass, or aramid fiber reinforced epoxy. In one non-limiting embodiment, and if there is more than one rib 90, the ribs 90 may be formed from dissimilar materials (e.g., one rib is formed from metal and another is formed from a composite). Alternatively, all of the ribs may be formed from the same material. In one embodiment, the circumferential ribs 90 are located where a root of a released blade would impact the radially inner most layers (e.g., structural material and an impact absorbing material 74, 82) of the casing 72. Still further and in one non-limiting embodiment, the circumferential ribs 90 are embedded or located in only one of the layers 82, 84 and 86.

In one non-limiting embodiment, the materials for the sheets 74, 76, 78 and 80 and layers 82, 84 and 86 may be a variety of combinations e.g., some of the sheets may be metal, some composite, and some bulk layers 82, 84 and 86 may be honeycomb, others foam. Still further and in one non-limiting embodiment, the material for the sheets 74, 76, 78 and 80 may be all of the same material e.g., metal or composite and the layers 82, 84 and 86 may all of the same material e.g., honeycomb or foam.

In yet another embodiment, the casing 72 may be formed without any circumferential ribs 90.

The inner most sheet metal sheet or inner ring portion 74 may be formed with a recessed area 75 for receipt of an abradable surface 77 such as a composite potting material or compound. The abradable surface 77 being aligned with rotating blades 22 of the fan 12. The recessed area 75 and the abradable surface 77 are located on a radially inner surface 79 of the inner most sheet metal sheet or inner ring portion 74. Of course, embodiments of the present disclosure contemplate an inner ring portion or inner most sheet metal sheet 74 without the recessed area 75 and abradable surface 77. The inner ring portion or inner most sheet metal sheet 74 may also be configured to have perforations for acoustic purposes.

The initial impact of the release blade 92 begins like a projectile (high energy, small, concentrated impact area) but quickly turns into something more like a bellyflop (high energy, but large surface area). Using a significant thickness of the case or casing 72 allows the released blade 92 to flop before piercing an outer wall of the case or casing 72, and once the released blade 92 flops, a large volume of the honeycomb layers 82, 84 and 86 is used to dissipate most of the energy in crushing of the honeycomb layers 82, 84 and 86. The remaining energy is absorbed by the sheet metal 80.

In one non-limiting embodiment, the outer layer 80 is configured with at least one humps or hairpins or hairpin features 96, that allow large deformation before failure as shown in FIG. 5. The humps or hairpins or hairpin features 96 may be referred as a first hump or hairpin or hairpin feature 96 and a second hump or hairpin or hairpin feature 96. The first hump or hairpin or hairpin feature 96 is located forward with respect to the second hump or hairpin or hairpin feature 96. Alternatively and as mentioned below, the outer layer is configured to only have a single hump or hairpin or hairpin feature 96.

As used herein forward or upstream and rearward or downstream refer are relative to the engine central longitudinal axis 26 and the direction gases flowing through the gas turbine engine 10. In addition, radially inward and radially outward also refer to the engine central longitudinal axis 26.

As illustrated in at least FIGS. 2 and 5, each hairpin feature 96 includes a first radially extending wall portion 98 secured to a second radially extending wall portion 100. In one embodiment, the first radially extending wall portion 98 is spaced from the second radially extending wall portion 100 in order to define a cavity. Alternatively, the first radially extending wall portion 98 is adjacent to the second radially extending wall portion 100 such that no cavity is defined therebetween. Although, the wall portions 98 and 100 are referred to as radially extending it is understood that radially extending is intended to cover all configurations of radial extension (e.g., linear, orthogonal rounded, curved) unless otherwise noted and as long as some portion of the wall portions extends radially. The first radially extending wall portion 98 being forward with respect to the second radially extending wall portion 100. In addition, the first radially extending wall portion 98 and the second radially extending wall portion 100 are connected to each other at one end by an axially extending portion 102 while an opposite end of the first radially extending wall portion 98 and the second radially extending wall portion 100 are not connected to each other such that a cavity 104 is defined by the first radially extending wall portion 98, the second radially extending wall portion 100 and the axially extending portion 102.

Although the case or casing 72 is shown with a pair of humps or hairpins or hairpin features 96 and in an alternative embodiment of the present disclosure, the case or casing 72 is configured to have only a single hump or hairpin or hairpin feature 96 which may be located on forward or aft on the case or casing 72. In yet another alternative embodiment, the case or casing 72 is configured to not have any hump or hairpin or hairpin feature 96.

In one non-limiting embodiment, the first radially extending wall portion 98 has a longer axial length than the second radially extending wall portion 100 of the first hairpin feature 96 such that an offset 106 is provided between the first radially extending wall portion 98 and the second radially extending wall portion 100 of the first hairpin feature 96. Similarly, the first radially extending wall portion 98 of the second hairpin feature 96 has a shorter axial length than the second radially extending wall portion 100 of the second hairpin feature 96 such that an offset 106 is provided between the first radially extending wall portion 98 and the second radially extending wall portion 100 of the second hairpin feature 96. Alternatively, the first radially extending wall portion 98 and the second radially extending wall portion 100 have a similar length in the radial direction such that no offset 106 is provided.

As such, when the dislodged blade 92 has contacted the outer layer 80 it is displaced radially outward and the second radially extending wall portion 100 of the first hairpin feature 96 is displaced from the first radially extending wall portion 98 and the first radially extending wall portion 98 of the second hairpin feature 96 is displaced from the second radially extending wall portion 100 of the second hairpin feature 96.

The hairpin geometry can vary, and may or may not include the aforementioned radial offsets 106 between adjacent surfaces, and could be of variable thickness material depending on the containment energies and geometries involved.

In addition, the location, number, thickness, and height of the circumferential ribs 90 enables the case or casing 72 to be tuned the released blade's 92 trajectory in order to optimize the interaction between the released blade 92 and the case or casing 72.

Figure 3:
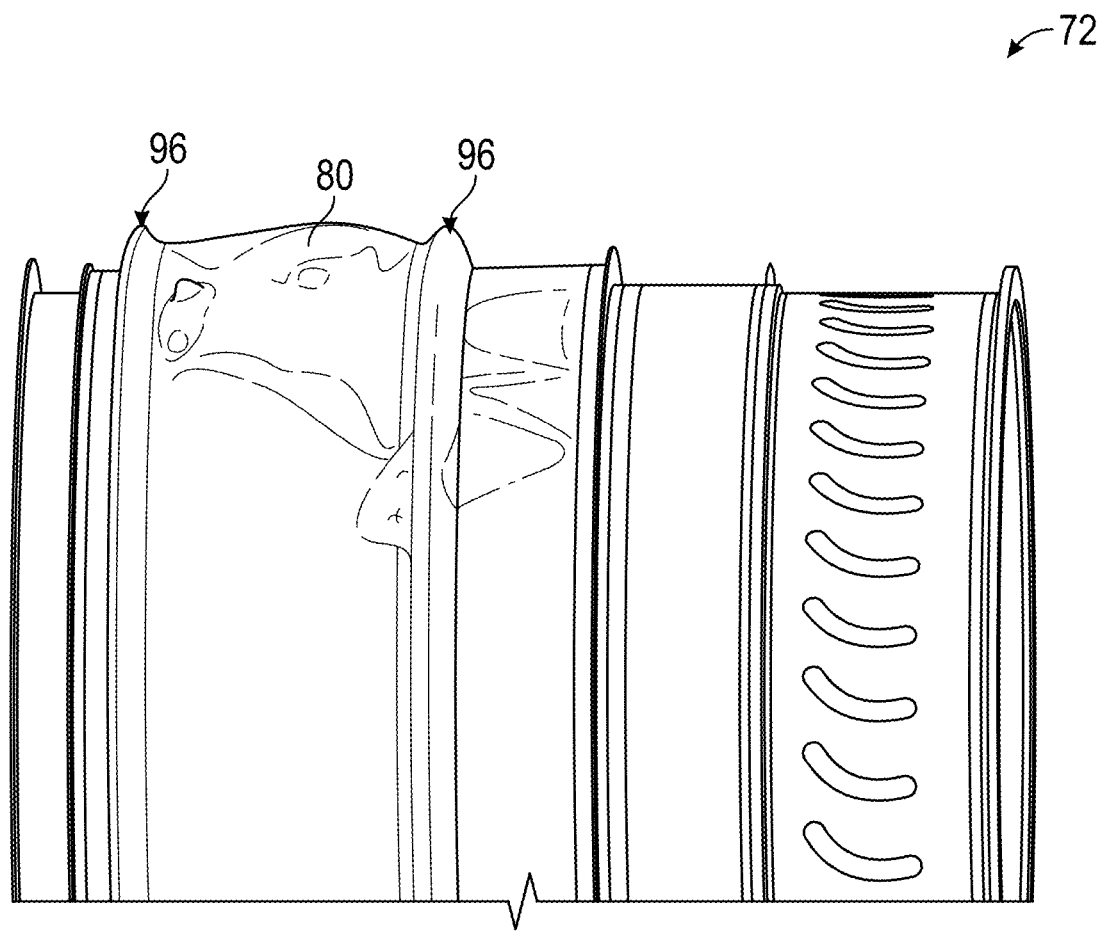
FIG. 3 is a view of a portion of the fan case and a fan in accordance with the present disclosure.

Since the fan blades 22 are very thin, the released blade 92 begins to impact the case, the blade tip bends as shown in FIG. 3. As the released blade 92 continues it is slowed down and a following blade 22 (e.g., non released blade) hits it, knocking a lower half of the released blade 92 downstream causing a bottom portion of the release blade 92 to impact the case or casing flatwise as shown in FIG. 4. These dynamics mean that the released blade 92 impact begins like a projectile (high energy, small, concentrated impact area) but quickly turns into something more like a bellyflop (high energy, but large surface area). Using a significant thickness for the honeycomb layers 82, 84 and 86 allows the release blade 92 to flop before piercing the outermost wall 80, and once the blade flops, a large volume of one of the honeycomb layers 82, 84 and 86 is used to dissipate most of the energy in crushing. The remaining energy is absorbed by the sheet metal, wherein the outer most layer 80 may be configured with humps or hairpins 96 which allow large deformation before failure as shown in FIG. 5.

As such, the fan case or casing 72 can have a lighter weight similar to a soft wall design, allow blade nesting, and does not impose significantly greater forces on adjacent structures during a blade release event.

In one non-limiting embodiment, the outer layer 80 is generally aligned with an area corresponding to a direct impact zone or impact zone 97 for a dislodged blade 40 and portions of the honeycomb layers 82, 84 and 86 located axially forward or rearward of the outer layer 80 and/or the direct impact zone 97 are configured to fail in tension or crumple axially and/or partially radially to allow for the sheet metal of at leas the outer layer 80 to move or expand during contact the released blade 92 in order to assist in retaining the dislodged blade 92 and absorb its impact forces into the casing or case 72.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A casing for a gas turbine engine, comprising:
a multi-layer configuration for absorbing impact forces comprising a plurality of layers of a structural material, wherein each layer of the plurality of layers of the structural material are separated from each other by at least one layer of an impact absorbing material, the at least one layer of impact absorbing material being different from the structural material and the impact absorbing material having a radial thickness that is greater than a radial thickness of the structural material, the plurality of layers of the structural material comprise an inner most layer, at least one intermediate layer and an outer most layer, the inner most layer defining a portion of an interior surface of the casing and the outer most layer defining a portion of an exterior surface of the casing, and the outer most layer includes at least one hairpin feature configured to deform before failure, the at least one hairpin feature having a first radially extending wall portion connected to a second radially extending wall portion, the first radially extending wall portion being spaced from the second radially extending wall portion such that a cavity is defined by the first radially extending wall portion and the second radially extending wall portion, and the at least one intermediate layer being located between the inner most layer and the outer most layer.

2. The casing as in claim 1, further comprising radially extending circumferential ribs that are embedded into the at least one layer of an impact absorbing material, the radially extending circumferential ribs being configured to define an area of absorption in the at least one layer of an impact absorbing material.

3. The casing as in claim 1, wherein the structural material is a reinforced composite material and/or sheet metal and the at least one layer of impact absorbing material is made of honeycomb and/or foam and/or corrugated metal.

4. The casing as in claim 1, wherein the structural material is a sheet metal or a reinforced composite material and the impact absorbing material is a layer of foam.

5. The casing as in claim 1, further comprising radially extending circumferential ribs that are embedded into the at least one layer of an impact absorbing material, the radially extending circumferential ribs being configured to define an area of absorption in the at least one layer of an impact absorbing material and wherein the radially extending circumferential ribs extend from the inner most layer towards the at least one intermediate layer and/or from the at least one intermediate layer towards the inner most layer.

6. The casing as in claim 1, wherein the inner most layer and the intermediate layer are formed from a composite material, and the outer most layer is formed from metal and the at least one layer of impact absorbing material located between the inner most layer and the intermediate layer is a honeycomb material and the at least one layer of impact absorbing material located between the intermediate layer and the outer most layer is a honeycomb.

7. The casing as in claim 1, wherein the at least one hairpin feature is a first hairpin feature and a second hairpin feature, the second hairpin feature having a first radially extending wall portion connected to a second radially extending wall portion.

8. The casing as in claim 7, wherein the first hairpin feature is forward of a direct impact zone defined by the outer most layer and the second hairpin feature is rearward of the direct impact zone defined by the outer most layer.

9. The casing as in claim 7, wherein the first radially extending wall portion of the first hairpin feature has a longer axial length than the second radially extending wall portion of the first hairpin feature such that an offset is provided between the first radially extending wall portion of the first hairpin feature and the second radially extending wall portion of the first hairpin feature and the first radially extending wall portion of the second hairpin feature has a longer axial length than the second radially extending wall portion of the second hairpin feature such that an offset is provided between the first radially extending wall portion of the second hairpin feature and the second radially extending wall portion of the second hairpin feature.

10. The casing as in claim 7, wherein an end of the first radially extending wall portion of the first hairpin feature is connected to an end of the second radially extending wall portion of the first hairpin feature by an axially extending portion of the first hairpin feature and an opposite end of the first radially extending wall portion of the first hairpin feature is not connected to an opposite end of the second radially extending wall portion of the first hairpin feature such that the cavity is defined by the first radially extending wall portion, the second radially extending wall portion and the axially extending portion of the first hairpin feature and an end of the first radially extending wall portion of the second hairpin feature is connected to an end of the second radially extending wall portion of the second hairpin feature by an axially extending portion of the second hairpin feature and an opposite end of the first radially extending wall portion of the second hairpin feature is not connected to an opposite end of the second radially extending wall portion of the second hairpin feature such that a cavity is defined by the first radially extending wall portion, the second radially extending wall portion and the axially extending portion of the second hairpin feature.

11. The casing as in claim 1, wherein an end of the first radially extending wall portion is connected to an end of the second radially extending wall portion by an axially extending portion and an opposite end of the first radially extending wall portion is not connected to an opposite end of the second radially extending wall portion such that the cavity is defined by the first radially extending wall portion, the second radially extending wall portion and the axially extending portion.

12. The casing as in claim 11, wherein a portion of the at least one layer of an impact absorbing material is located in the cavity.

13. The casing as in claim 12, wherein the structural material is a sheet metal or a reinforced composite material and the impact absorbing material is layer of honeycomb material or foam.

14. The casing as in claim 1, wherein the first radially extending wall portion has a longer axial length than the second radially extending wall portion such that an offset is provided between the first radially extending wall portion and the second radially extending wall portion.

15. A gas turbine engine, comprising:
a fan having a plurality of fan blades;
a casing surrounding the plurality of fan blades, the casing comprising:
a multi-layer configuration for absorbing impact forces comprising a plurality of layers of a structural material, wherein each layer of the plurality of layers of the structural material are separated from each other by at least one layer of an impact absorbing material, the at least one layer of impact absorbing material being different from the structural material and the impact absorbing material having a radial thickness that is greater than a radial thickness of the structural material, the plurality of layers of the structural material comprise an inner most layer, at least one intermediate layer and an outer most layer, the inner most layer defining a portion of an interior surface of the casing and the outer most layer defining a portion of an exterior surface of the casing, and the outer most layer includes at least one hairpin feature configured to deform before failure, the at least one hairpin feature having a first radially extending wall portion connected to a second radially extending wall portion, the first radially extending wall portion being spaced from the second radially extending wall portion such that a cavity is defined by the first radially extending wall portion and the second radially extending wall portion, and the at least one intermediate layer being located between the inner most layer and the outer most layer.

16. The gas turbine engine as in claim 15, further comprising:
radially extending circumferential ribs that are embedded into the at least one layer of an impact absorbing material, the radially extending circumferential ribs being configured to define an area of absorption in the at least one layer of an impact absorbing material.

17. The gas turbine engine as in claim 16, wherein the radially extending circumferential ribs extend from the inner most layer towards the at least one intermediate layer and/or from the at least one intermediate layer towards the inner most layer.

* * * * *